United States Patent Office 3,847,929
Patented Nov. 12, 1974

3,847,929
HYDROXY OR ALKOXY DERIVATIVES OF 5-HALO-1H-PYRAZOLO[3,4-b]PYRIDINES
Theodore Denzel, Nurnberg, and Hans Hoehn, Tegernheim, Germany, assignors to E. R. Squibb & Sons, Inc., Princeton, N.J.
No Drawing. Filed Mar. 16, 1973, Ser. No. 342,020
Int. Cl. C07d 31/42
U.S. Cl. 260—296 H      12 Claims

ABSTRACT OF THE DISCLOSURE

New alkoxy derivatives of 5-halo-1H-pyrazolo[3,4-b]-pyridines have the general formula

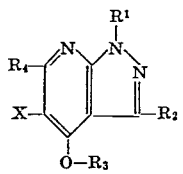

They are useful as antiinflammatory agents and as central nervous system depressants. They also increase the intracellular concentration of adenosine-3′,5′-cyclic monophosphate.

SUMMARY OF THE INVENTION

This invention relates to new alkoxy derivatives of 5-halo-pyrazolo[3,4-b]pyridines, and salts of these compounds. These new compounds have the general formula (I)

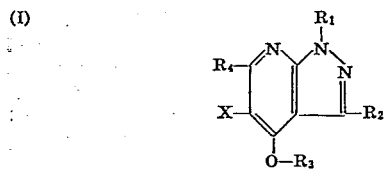

The symbols have the following meanings in formula I and throughout this specification. $R_1$ is hydrogen, lower alkyl, phenyl or phenyl-lower alkyl. $R_2$ is hydrogen or lower alkyl. $R_3$ is hydrogen, lower alkyl, phenyl, phenyl-lower alkyl or dilower alkylamino-lower alkyl, lower alkylmercapto-lower alkyl, lower alkoxy-lower alkyl. $R_4$ is hydrogen, lower alkyl or phenyl and X is halogen.

DETAILED DESCRIPTION OF THE INVENTION

The lower alkyl groups in any of the foregoing radicals are straight or branched chain hydrocarbon groups of up to seven carbon atoms like methyl, ethyl, propyl, butyl, t-butyl and the like, the five named being preferred. In the nitrogen, oxygen and sulfur containing radicals, two to three carbon alkyl groups are preferred. All four common halogens are included, but bromine and chlorine are preferred.

The products of the examples, which are representative of the various compounds of this invention, constitute particularly preferred embodiments, especially Examples 1 to 5. In general, preferably $R_1$ is hydrogen or lower alkyl, especially ethyl, $R_2$ is hydrogen or lower alkyl, especially methyl, $R_3$ is hydrogen or lower alkyl especially ethyl, propyl and butyl. $R_4$ is hydrogen or lower alkyl, especially methyl, and X is bromine or chorine.

The new compounds of formula I are formed by the following series of reactions. The symbols in the structural formulas have the same meaning as previously described.

A 5-aminopyrazole of the formula (II)

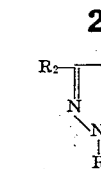

[produced analogous to the procedure described in Z.f. Chemie 10, 386 (1970)] is made to react with an α-halogen-β-ketoester of the formula (III)

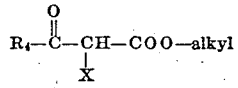

by heating at a temperature of about 85–90°, while distilling off the water formed by means of a condenser, producing a compound of formula (IV)

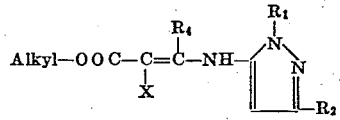

Heating of the compound of formula IV in an inert organic solvent like diphenyl ether at a temperature of about 220–240° produces a compound of the formula (V)

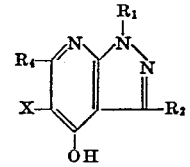

with a hydroxy group in the 4-position of the molecule.

Instead of isolating compounds of formula IV, compounds of formula V may immediately be produced by heating the aminopyrazole of formula II with the haloester of formula III in an acidic solvent, like acetic acid, for several hours at reflux temperature.

The compound of formula I is then produced by alkylating the compound of formula V with the appropriate alkyl halide in an organic solvent like dimethylformamide in the presence of an inorganic base like potassium carbonate.

According to a modification of the foregoing procedure a product of formula I wherein $R_1$ is hydrogen may be produced. By this modification a 5-aminopyrazole of formula II, wherein $R_1$ is an arylmethyl group or preferably a heteromethyl group, is used. This starting material has the formula (IIa)

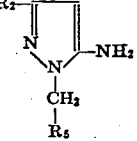

wherein $R_5$ is an aromatic or heterocyclic nucleus like phenyl, furyl, pyridyl or pyrimidyl.

This material is processed as described above through the reaction with the halo-β-keto ester of formula III to obtain a compound of formula V with a hydroxy group in the 4-position. Alkylating leads to a compound of the formula (Ia)

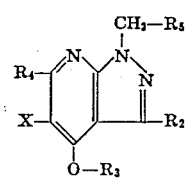

At this point, the compound of formula Ia is oxidized with an oxidizing agent like selenium dioxide in a high boiling solvent like diethyleneglycol dimethyl ether at about 160°. This yields a compound of formula I wherein $R_1$ is hydrogen.

In addition, compounds of formula I are obtained by direct halogenation of pyrazolopyridines of the general formula (VI)

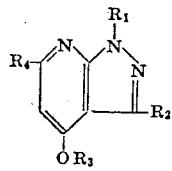

in the presence of a suitable solvent, e.g., acetic acid, chloroform, dichloromethane and the like. Addition of a basic agent like sodium acetate, trialkylamine etc. may be of advantage in some cases.

The starting pyrazolopyridines of formula VI in which $R_3$ represents hydrogen are obtained by reacting a 5-amino-pyrazole of formula II with an ester of formula III in which X stands for hydrogen. The cyclization preferably is effected by polyphosphorous acid or glacial acetic acid, according to Chem. Ber. *101*, 3275 (1968).

The compounds of formula I form salts which are also part of this invention. The salts include acid addition salts, particularly the non-toxic, physiologically acceptable members. The bases of formula I form salts by reaction with a variety of inorganic and organic acids providing acid addition salts including, for example, the hydrohalides (especially the hydrochloride), sulfate, nitrate, phosphate, oxalate, tartrate, malate, citrate, acetate, ascorbate, succinate, benzenesulfonate, toluenesulfonate, cyclohexanesulfonate, cyclohexanesulfamate, etc.

The new compounds of this invention are central nervous system depressants and may be used as tranquilizers or ataractic agents for the relief of anxiety and tension states, for example, in mice, cats, rats, dogs and other mammalian species, in the same manner as chlordiazepoxide. For this purpose a compound or mixture of compounds of formula I, or non-toxic, physiologically acceptable acid addition salt thereof, may be administered orally or parenterally in a conventional dosage form such as tablet, capsule, injectable or the like. A single dose, or preferably 2 to 4 divided daily doses, provided on a basis of about 1 to 50 mg. per kilogram per day, preferably about 2 to 15 mg. per kilogram per day, is appropriate. These may be conventionally formulated in an oral or parenteral dosage form by compounding about 10 to 250 mg. per unit of dosage with conventional vehicle, excipient, binder, preservative, stabilizer, flavor or the like as called for by accepted pharmaceutical practice.

The new compounds also increase the intracellular concentration of adenosine-3',5'-cyclic monophosphate, and thus by the administration of about 1 to 100 mg./kg./day, preferably about 10 to 50 mg./kg., in single or two to four divided doses in conventional oral or parenteral dosage forms such as those described above may be used to alleviate the symptoms of asthma.

The new compounds of this invention in addition have antiinflammatory properties and are useful as antiinflammatory agents, for example, to reduce local inflammatory conditions such as those of an edematous nature or resulting from proliferation of connective tissue in various mammalian species such as rats, dogs and the like when given orally in dosages of about 5 to 50 mg./kg./day, preferably 5 to 25 mg./kg./day, in single or 2 to 4 divided doses, as indicated by the carageenan edema assay in rats. The active substance may be utilized in compositions such as tablets, capsules, solutions or suspensions containing up to about 300 mg. per unit of dosage of a compound or mixture of compounds of formula I or physiologically acceptable acid addition salt thereof. They may be compounded in conventional manner with a physiologically acceptable vehicle or carrier, excipient, binder, preserva-tive, stabilizer, flavor, etc. as called for by accepted pharmaceutical practice. Topical preparations containing about 0.01 to 3 percent by weight of active substance in a lotion, salve or cream may also be used.

The following examples are illustrative of the invention. All temperatures are on the centigrade scale.

EXAMPLE 1

5-Chloro-4-ethoxy-1-ethyl-6-methyl-1H-pyrazolo[3,4-b]pyridine (a) 2-Chloro - 3 - [(1-ethyl - 5 - pyrazolyl)amino]crotonic acid ethyl ester.—1111 g. of 5-Amino-1-ethyl-pyrazole (1 mol.) and 164 g. of α-chloroacetoacetic acid ethyl ester are heated in 600 ml. of benzene at reflux temperature. The water formed is removed continuously by means of a condenser. Heating is continued until the theoretical amount of water has been formed (approximately 10 hours). After this time, the benzene layer is decanted from the viscous oil and evaporated to dryness. The oily residue is recrystallized from diethyl ether yielding 164 g. of 2-chloro-3-[(1-ethyl - 5 - pyrazolyl)amino]crotonic acid ethyl ester, m.p. 42–44°.

(b) 5 - Chloro-1-ethyl-4-hydroxy-6-methyl-1H-pyrazolo[3,4-b]pyridine.—51.4 g. of 2-Chloro-3-[(1-ethyl-5-pyrazolyl)amino]crotonic acid ethyl ester (0.2 mol.) are dissolved in 200 ml. of diphenyl ether. The solution is heated at 240–250° while the alcohol formed is distilled off. After 30 minutes, the solvent is removed by distillation ($b.p._{.05}=95-99°$), the residue is treated with 200 ml. of methanol and the crystalline precipitate of 5-chloro-1-ethyl-4-hydroxy - 6 - methyl-1H-pyrazolo[3,4-b]pyridine is filtered off and recrystallized from methanol, yield 32.5 g. (76%), m.p. 241–243°.

(c) 5-Chloro - 1 - ethyl - 4 - ethoxy-6-methyl-1H-pyrazolo[3,4-b]pyridine.—21.1 g. of 5-Chloro - 1 - ethyl-4-hydroxy-6-methyl - 1H - pyrazolo[3,4-b]pyridine (0.1 mol.), 21 g. of potassium carbonate (0.15 mol.) and 18.6 g. of ethyl iodide (0.12 mol.) are heated together in 200 ml. of dimethylformamide for 10 hours at 60–70° with continuous stirring. After this period, the mixture is cooled to room temperature and filtered. Some water is added to the filtrate (50 ml.). 5-Chloro-1-ethyl-4-ethoxy-6-methyl-1H-pyrazolo[3,4-b]pyridine precipitates and is filtered off and recrystallized from ligroin. Yield 16.3 g. (68%), m.p. 52–54°.

EXAMPLE 2

5-Chloro-4-ethoxy-6-methyl-1H-pyrazolo[3,4-b]pyridine (a) 2-Chloro-3-[(1-furfuryl - 5 - pyrazolyl)amino]crotonic acid ethyl ester.—163 g. of 5-Amino-1-furfurylpyrazole (1 mol.) and 164 g. of α-chloro acetoacetic acid ethyl ester are heated in 600 ml. of benzene at reflux temperature. The water formed is continuously removed by means of a condenser. When the theoretical amount of water has distilled off, the benzene layer is decanted from the viscous oil at the bottom of the flask. The benzene is evaporated in vacuo and the residue is recrystallized from diethyl ether yielding 225 g. of 2-chloro-3-[(1-furfuryl-5-pyrazolyl)amino]crotonic acid ethyl ester, (73%), m.p. 36–38°.

(b) 5-Chloro - 1 - furfuryl - 4 - hydroxy - 6 - methyl-1H-pyrazolo[3,4-b]pyridine.—61.8 g. of 2-Chloro-3-[(1-furfuryl-5-pyrazolyl)amino]crotonic acid ethyl ester (0.2 mol.) are heated in 200 ml. of acetic acid for 5 hours under reflux. The solvent is distilled off and the crystalline residue of 5-chloro-1-furfuryl-4-hydroxy-6-methyl-1H-pyrazolo[3,4-b]pyridine is recrystallized from methanol. Yield 42 g. (80%), m.p. 263–265°.

(c) 5-Chloro - 4 - ethoxy - 1 - furfuryl - 6 - methyl-1H-pyrazolo[3,4-b]pyridine.—26.3 g. of 5-Chloro-1-furfuryl-4 - hydroxy - 6 - methyl-1H-pyrazolo[3,4-b]pyridine (0.1 mol.), 21 g. of potassium carbonate (0.15 mol.) and 18.6 g. of ethyl iodide are heated together in 200 ml. of dimethylformamide for 10 hours at 60–70° with permanent stirring. After this period, the mixture is cooled to room temperature and filtered. About 50 ml. of water are added. 5-Chloro-4-ethoxy-1-furfuryl - 6 - methyl - 1H - pyrazolo[3,4-b]pyridine crystallizes on cooling. Recrystallization from ligroin yields 21 g. (72%), m.p. 62–63°.

(d) 5-Chloro - 4 - ethoxy-6-methyl-1H-pyrazolo[3,4-b]pyridine.—5.8 g. of 5-Chloro-4-ethoxy-1-furfuryl-6-methyl-1H-pyrazolo[3,4-b]pyridine (0.02 mol.) and 2.4 g. of selenium dioxide (0.022 mol.) are heated in 30 ml. of diethyleneglycol dimethyl ether at 160° for 1.5 hours. The mixture is filtered hot and the filtrate is cooled in an ice-bath. 5 - Chloro-4-ethoxy-6-methyl-1H-pyrazolo[3,4-b]pyridine crystallizes. Yield: 2.8 g. (67%), m.p. 221–223°.

EXAMPLE 3

5-Chloro-1-ethyl-6-methyl-4-[(3-dimethylamino)propoxy]-1H-pyrazolo[3,4-b]pyridine (a) 5 - Chloro - 1 - ethyl - 4 - hydroxy - 6 - methyl-1H-pyrazolo[3,4-b]pyridine.—111 g. of 5 - Amino - 1 - ethylpyrazole (1 mol.) and 104 g. of α-chloro acetoacetic acid ethyl ester are heated in 500 ml. of acetic acid at reflux temperature for 6 hours. The solvent is distilled off and the crystalline residue of 5 - chloro - 1 - ethyl-4-hydroxy-6-methyl - 1H - pyrazolo[3,4-b]pyridine is purified by recrystallization from methanol. Yield 120 g. (57%), m.p. 241–243°.

(b) 5 - Chloro - 1 - ethyl - 6 - methyl-4[(3-dimethylamino)propoxy] - 1H - pyrazolo[3,4-b] pyridine.—4.2 g. of 5 - Chloro - 1 - ethyl - 4 - hydroxy - 6 - methyl-1H-pyrazolo[3,4-b]pyridine (0.02 mol.), 3.1 g. of potassium carbonate (0.022 mol.) and 2.6 g. of dimethylaminopropyl chloride (0.022 mol.) are heated with stirring in 50 ml. of dimethylformamide at 60° for 10 hours. After this period, the solid is filtered off and the filtrate is evaporated to dryness. The oily residue is extracted 3 times with 10 ml. portions of hot petroleum ether. The collected extracts are clarified with charcoal, filtered and cooled in an ice-bath. 5 - Chloro - 1 - ethyl - 6 - methyl-4-[(3-dimethylamino)propoxy] - 1H - pyrazolo[3,4-b]pyridine precipitates, is filtered and recrystallized from petroleum ether. Yield: 3.8 g. (64%), m.p. 32–33°.

EXAMPLE 4

5-Bromo-1-benzyl-4-hydroxy-6-methyl-1H-pyrazolo[3,4-b]pyridine (a) 1 - Benzyl - 4 - hydroxy - 6 - methyl - 1H-pyrazolo[3,4-b]pyridine.—34.6 g. of 5-Amino-1-benzylpyrazole (0.2 mol.) and 26 g. of acetoacetic acid ethyl ester (0.2 mol.) are refluxed for 5 hours. After cooling, the precipitated crystals are filtered with suction (28.7 g.) and recrystallized from ethanol to yield 1 - benzyl - 4 - hydroxy-6 - methyl - 1H - pyrazolo[3,4-b]pyridine, m.p. 224–225°. An additional crop is obtained by working up the mother liquor. Total yield 32.2 g., (67.3%).

(b) 5 - Bromo - 1 - benzyl - 4 - hydroxy-6-methyl-1H-pyrazolo[3,4-b]pyridine.—To 10 g. of 1-benzyl-4-hydroxy-6-methyl - 1H - pyrazolo[3,4-b]pyridine (0.041 mol.) dissolved in a mixture of 30 ml. of glacial acetic acid and 3.25 g. of pyridine, a solution consisting of 6.56 g. of bromine (0.082 mol.) in 20 ml. of glacial acetic acid is added drop by drop. During the addition of the bromine solution, the brominated compound precipitates and is neutralized with diluted aqueous ammonia yielding 8.8 g. of 5 - bromo - 1 - benzyl-4-hydroxy-6-methyl-1H-pyrazolo[3,4-b]pyridine. After recrystallization from ethanol, the product melts at 267° (dec.). By working up the mother liquor and additional amount of 2 g. is obtained. Total yield 10.8 g. (82.7%).

EXAMPLE 5

5-Bromo-3,6-dimethyl-1-ethyl-4-hydroxy-1H-pyrazolo[3,4-b]pyridine (a) 3,6 - Dimethyl - 1 - ethyl - 4-hydroxy-1H-pyrazolo[3,4-b]pyridine.—43.7 g. of 1 - Ethyl - 3 - methyl-5-amino-pyrazole (0.35 mol.) and 45.55 g. of acetoacetic acid ethyl ester (0.35 mol.) are added to 140 g. of polyphosphorous acid. The mixture is heated with stirring at 130° to 140° for one hour. Then, the mixture is cooled, diluted with 380 ml. of water, stirred at room temperature for 30 minutes, neutralized with conc. aqueous ammonia and then extracted four times with 150 ml. portions of chloroform. The combined chloroform layers are dried over sodium sulfate and the solvent is distilled off. The residue is treated with about 300 ml. of ether and several drops of ethanol which causes the oily mass to become crystalline. The 3,6 - dimethyl - 1 - ethyl-4-hydroxy-1H-pyrazolo[3,4-b]pyridine is filtered off and recrystallized from acetonitrile to give 43.56 g. (66%), m.p. 200–202°.

(b) 5 - Bromo - 3,6 - dimethyl - 1 - ethyl-4-hydroxy-1H - pyrazolo[3,4-b]pyridine.—Following the procedure of Example 4 step 2, the reaction of 11.5 g. of 3,6-dimethyl - 1 - ethyl - 4 - hydroxy - 1H - pyrazolo[3,4-b]pyridine (0.06 mol.) with 9.6 g. of bromine (0.12 mol.) gives 5 - bromo - 3,6 - dimethyl - 1 - ethyl-4-hydroxy-1H-pyrazolo[3,4-b]pyridine, which is recrystallized from ethanol, m.p. 244–245° dec., yield 13.95 g. (86%).

The following additional products are obtained by the procedure of Example 1 (or Example 2 when $R_1$ is hydrogen).

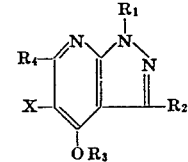

| Ex. | $R_1$ | $R_2$ | $R_3$ | $R_4$ | X |
|---|---|---|---|---|---|
| 6 | $C_2H_5$ | H | $-(CH_2)_2CH(CH_3)_2$ | $CH_3$ | Cl |
| 7 | $C_6H_5$ | $CH_3$ | $C_2H_5$ | H | Br |
| 8 | $C_6H_5(CH_2)_2-$ | $CH_3$ | H | $CH_3$ | Cl |
| 9 | $C_6H_5CH_2-$ | $CH_3$ | H | H | Cl |
| 10 | $C_6H_5CH_2-$ | $CH_3$ | $-(CH_2)_3CH(CH_3)_2$ | $CH_3$ | Br |
| 11 | $C_6H_5CH_2$ | H | $-(CH_2)_2SCH_3$ | $CH_3$ | Br |
| 12 | $C_2H_5$ | $CH_3$ | $-(CH_2)_2OCH_3$ | $CH_3$ | Cl |
| 13 | $C_2H_5$ | $C_2H_5$ | H | $C_2H_4$ | Br |
| 14 | $C_2H_5$ | H | $C_6H_5$ | $CH_3$ | Cl |
| 15 | $C_2H_5$ | $CH_3$ | $C_6H_5CH_2-$ | $CH_3$ | Cl |
| 16 | $CH_3$ | H | $C_6H_5(CH_2)_2-$ | $C_6H_5$ | Br |
| 17 | $C_2H_5$ | $CH_3$ | $C_6H_5$ | $CH_3$ | Cl |
| 18 | H | H | $-(CH_2)_3CH(CH_3)_2$ | $CH_3$ | Cl |
| 19 | $C_2H_5$ | $CH_3$ | $-(CH_2)_2CH(C_2H_5)_2$ | $CH_3$ | Br |
| 20 | $C_2H_5$ | H | $C_3H_7$ | $CH_3$ | Br |

What is claimed is:
1. A compound of the formula wherein
$R_1$ is hydrogen, methyl, ethyl, phenyl, benzyl or phenethyl;
$R_2$ is hydrogen methyl or ethyl;
$R_3$ is hydrogen, lower alkyl, phenyl, phenyl-lower alkyl, di-lower alkylamino-lower alkyl, lower alkylmercapto-lower alkyl or lower alkoxy-lower alkyl;
$R_4$ is hydrogen, methyl, ethyl or phenyl, and X is halogen,
and physiologically acceptable acid addition salts thereof.
2. A compound according to Claim 1 wherein $R_3$ is hydrogen.
3. A compound according to Claim 1 wherein $R_3$ is lower alkyl.
4. A compound according to Claim 2 wherein X is chlorine or bromine.
5. A compound according to Claim 3 wherein X is chlorine or bromine.
6. A compound according to Claim 1 wherein $R_1$, $R_2$, $R_3$ and $R_4$ each is hydrogen or lower alkyl and X is bromine or chlorine.

7. A compound according to Claim 1 wherein $R_1$ and $R_3$ each is ethyl, $R_2$ is hydrogen and X is chloro.

8. A compound according to Claim 1 wherein $R_1$ and $R_2$ each is hydrogen, $R_3$ is ethyl, $R_4$ is methyl and X is chloro.

9. A compound according to Claim 1 wherein $R_1$ and $R_4$ each is lower alkyl, $R_2$ is hydrogen, $R_3$ is di-lower alkylamino-lower alkoxy and X is chloro or bromo.

10. A compound according to Claim 9 wherein $R_1$ is ethyl, $R_2$ is hydrogen, $R_4$ is methyl, X is chloro and the di-lower alkylamino-lower alkoxy group is dimethylaminopropoxy.

11. A compound according to Claim 1 wherein $R_1$ is benzyl, $R_2$ and $R_3$ each is hydrogen, $R_4$ is methyl and X is bromo.

12. A compound according to Claim 1 wherein $R_1$ is ethyl, $R_2$ and $R_4$ each is methyl, $R_3$ is hydrogen and X is bromo.

References Cited

UNITED STATES PATENTS 3,733,328    5/1973    Hoehn et al. _____ 260—296 H

FOREIGN PATENTS 2,135,170    1/1972    Germany _____ 260—293.6

ALAN L. ROTMAN, Primary Examiner

U.S. Cl. X.R.

260—294.8 R, 294.8 G, 295 S, 310 R; 424—263, 266